(12) United States Patent
Kwok et al.

(10) Patent No.: US 12,323,411 B2
(45) Date of Patent: Jun. 3, 2025

(54) AUTHENTICATION USING BRAIN-MACHINE INTERFACES

(71) Applicant: Capital One Services, LLC, McLean, VA (US)

(72) Inventors: Jennifer Kwok, New York, NY (US); Salik Shah, Washington, DC (US); Zviad Aznaurashvili, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 212 days.

(21) Appl. No.: 17/652,602

(22) Filed: Feb. 25, 2022

(65) Prior Publication Data
US 2023/0275889 A1    Aug. 31, 2023

(51) Int. Cl.
*H04L 9/40* (2022.01)

(52) U.S. Cl.
CPC .......... *H04L 63/083* (2013.01); *H04L 63/107* (2013.01)

(58) Field of Classification Search
CPC ............. H04L 63/0861; H04L 63/0853; H04L 63/083; H04L 63/107; H04L 2463/082
See application file for complete search history.

(56) References Cited

U.S. PATENT DOCUMENTS

| | | | |
|---|---|---|---|
| 7,844,547 B2 | 11/2010 | Amos | |
| 8,646,060 B1 * | 2/2014 | Ben Ayed | H04W 4/20 726/9 |
| 10,345,902 B1 * | 7/2019 | Yildiz | G02B 27/0093 |
| 10,489,785 B1 * | 11/2019 | Burks | G07D 11/00 |
| 10,546,108 B1 * | 1/2020 | Eidam | A61B 5/6802 |
| 11,395,141 B2 * | 7/2022 | Maleknejad | H04L 63/0853 |
| 12,165,150 B2 * | 12/2024 | Barkhurst | G06Q 20/4014 |
| 12,189,643 B1 * | 1/2025 | Montlary | G06F 16/248 |
| 12,200,479 B2 * | 1/2025 | Schmitt | H04L 67/52 |
| 2013/0340052 A1 * | 12/2013 | Jakobsson | H04L 63/083 726/5 |
| 2015/0338917 A1 * | 11/2015 | Steiner | H04L 9/3271 345/156 |

(Continued)

OTHER PUBLICATIONS

Kounte et al., "Implementation of Brain Machine Interface using Mind wave Sensor," Third International Conference on Computing and Network Communications (CoCoNet'19), 2020, pp. 244-252.

(Continued)

*Primary Examiner* — Mohammad A Siddiqi
(74) *Attorney, Agent, or Firm* — Harrity & Harrity, LLP

(57) ABSTRACT

In some implementations, a front-end device may receive, from a brain-machine interface (BMI) associated with a user, a request to authenticate the user with secret information associated with the user. Accordingly, the front-end device may transmit, to the BMI, a request for an identifier associated with one or more hardware components of the BMI. The front-end device may receive, from the BMI, an indication of the identifier associated with the one or more hardware components. Accordingly, the front-end device may authenticate the user based on the secret information associated with the user and the identifier associated with the one or more hardware components. Additionally, or alternatively, the front-end device may authenticate the user based on a location of an external device associated with the user and/or an indication of a biometric property associated with the user.

20 Claims, 10 Drawing Sheets

(56) References Cited

U.S. PATENT DOCUMENTS

| | | | | |
|---|---|---|---|---|
| 2015/0347734 | A1* | 12/2015 | Beigi | H04L 9/3268 |
| | | | | 726/28 |
| 2017/0372055 | A1* | 12/2017 | Robinson | H04W 12/104 |
| 2018/0113509 | A1* | 4/2018 | Kim | G16Y 10/65 |
| 2018/0158551 | A1* | 6/2018 | Bradley | G06V 40/10 |
| 2018/0268109 | A1* | 9/2018 | Ramgir | G16H 40/67 |
| 2019/0132733 | A1* | 5/2019 | Castinado | G16H 30/40 |
| 2019/0286806 | A1* | 9/2019 | Robinson | H04W 12/10 |
| 2020/0160324 | A1* | 5/2020 | Mars | H04L 63/083 |
| 2020/0175520 | A1* | 6/2020 | Mckay | G06Q 20/40145 |
| 2021/0064726 | A1* | 3/2021 | Mannby | H04L 63/0861 |
| 2021/0144008 | A1* | 5/2021 | Prager | G06V 40/1382 |
| 2021/0275034 | A1* | 9/2021 | Frank | A61B 5/0075 |
| 2023/0275889 | A1* | 8/2023 | Kwok | H04L 63/0861 |
| | | | | 726/6 |
| 2024/0380601 | A1* | 11/2024 | Duque | H04L 9/0866 |

OTHER PUBLICATIONS

Musk et al., "An Integrated Brain-Machine Interface Platform With Thousands of Channels," retrieved from https://doi.org/10.1101/703801, Jul. 16, 2019, 12 Pages.

Raajan et al., "A smart way to play using Brain Machine Interface (BMI)," School of Electrical & Electronics E11gineering, Sastra University, 2013, 6 Pages.

* cited by examiner

AUTHENTICATION USING BRAIN-MACHINE INTERFACES

BACKGROUND

Brain-machine interfaces are growing in popularity. For example, Neuralink®, Kernel®, and the MIT media lab have all developed brain-machine interfaces that can demodulate and decode at least some brainwaves and interpret the decoded brainwaves as commands and/or other input to a computer.

SUMMARY

Some implementations described herein relate to a system for authenticating a user associated with a brain-machine interface. The system may include one or more memories and one or more processors communicatively coupled to the one or more memories. The one or more processors may be configured to receive, from the brain-machine interface associated with the user, a request to authenticate the user with secret information associated with the user. The one or more processors may be further configured to transmit, to an external device associated with the user, a request for a location of the external device. The one or more processors may be configured to receive, from the external device, an indication of the location of the external device. The one or more processors may be further configured to transmit, to the brain-machine interface associated with the user, a request for an identifier associated with one or more hardware components of the brain-machine interface. The one or more processors may be configured to receive, from the brain-machine interface, an indication of the identifier associated with the one or more hardware components. The one or more processors may be further configured to authenticate the user based on the secret information associated with the user, the location of the external device, and the identifier associated with the one or more hardware components.

Some implementations described herein relate to a method of authenticating a user associated with a brain-machine interface. The method may include receiving, from the brain-machine interface associated with the user, a request to authenticate the user with secret information associated with the user. The method may further include transmitting, to the brain-machine interface associated with the user, a request for an identifier associated with one or more hardware components of the brain-machine interface. The method may include receiving, from the brain-machine interface, an indication of the identifier associated with the one or more hardware components. The method may further include authenticating the user based on the secret information associated with the user and the identifier associated with the one or more hardware components.

Some implementations described herein relate to a non-transitory computer-readable medium that stores a set of instructions for authenticating a user associated with a brain-machine interface for a device. The set of instructions, when executed by one or more processors of the device, may cause the device to receive, from the brain-machine interface associated with the user, a request to authenticate the user with secret information associated with the user. The set of instructions, when executed by one or more processors of the device, may further cause the device to receive an indication of a biometric property associated with the user. The set of instructions, when executed by one or more processors of the device, may cause the device to transmit, to the brain-machine interface associated with the user, a request for an identifier associated with one or more hardware components of the brain-machine interface. The set of instructions, when executed by one or more processors of the device, may further cause the device to receive, from the brain-machine interface, an indication of the identifier associated with the one or more hardware components. The set of instructions, when executed by one or more processors of the device, may cause the device to authenticate the user based on the secret information associated with the user, the indication of the biometric property, and the identifier associated with the one or more hardware components.

DETAILED DESCRIPTION

The following detailed description of example implementations refers to the accompanying drawings. The same reference numbers in different drawings may identify the same or similar elements.

Brain-machine interfaces (BMIs), also referred to as brain-computer interfaces (BCIs), help bridge a large remaining source of latency in interactions between humans and computers. This reduced latency may be experienced particularly with front-end devices, such as automated teller machines (ATM) and/or point-of-sale (PoS) systems, and with website access (e.g., over the Internet). However, access to front-end devices and websites is not secure when using single-factor authorization (e.g., using a password). Additionally, typical two-factor authorization techniques involve transmitting a code to a user's telephone via text or to a user's email address. Accordingly, this re-introduces latency and thus reduces speed improvement provided by use of a BMI. Additionally, unlike a typical user device, a BMI is unlikely to be able to store a cookie and/or another file permitting a front-end device or a website to skip two-factor authorization without compromising security.

Some implementations described herein provide for multi-factor authorization at a front-end device (or a website) using a BMI without using additional memory on the BMI and without increasing latency by asking the user to enter a two-factor code. As a result, processing resources, power, and memory are conserved at the BMI, and the front-end device experiences reduced latency without compromising security.

FIGS. 1A-1E are diagrams of an example 100 associated with authentication using BMIs. As shown in FIGS. 1A-1E, example 100 includes a BMI, a front-end device, a user device, and an authentication system. These devices are described in more detail in connection with FIGS. 4 and 5.

Figure 1A:
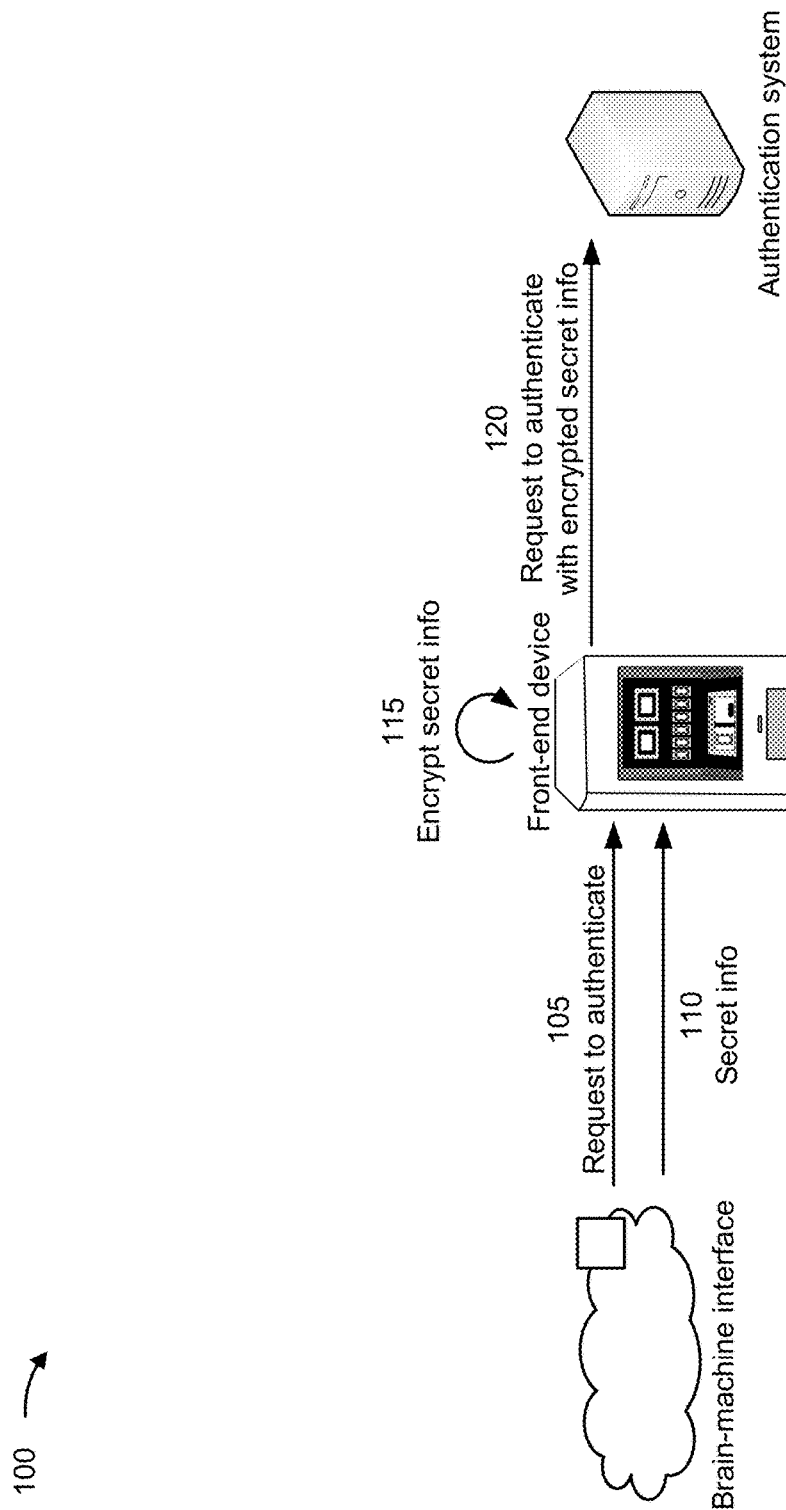
FIGS. 1A-1E are diagrams of an example implementation relating to authentication using brain-machine interfaces.

As shown in FIG. 1A and by reference number 105, the BMI may transmit, and the front-end device may receive, a request to authenticate a user. For example, the BMI may demodulate and decode brainwaves from the user to generate a digital signal encoding the request. Accordingly, the BMI may transmit the digital signal to the front-end device via a wired connection. Alternatively, the BMI may generate a radio frequency (RF) signal and/or another electromagnetic signal, based on the digital signal, such that a base station associated with the BMI may demodulate and decode the RF signal. In some implementations, the base station may be at least partially integrated (e.g., physically, logically, and/or virtually) with the front-end device. Alternatively, the base station may transmit a digital signal, based on the RF signal, to the front-end device via a wired connection.

The request may include a message and/or another similar data structure that initiates an authorization procedure with the front-end device. Additionally, as shown by reference number 110, the BMI may transmit, and the front-end device may receive, secret information associated with the user. In some implementations, the secret information may be included with the request. For example, the data structure that is the request may include the secret information therein. As an alternative, and as described in connection with FIG. 2, the secret information may be transmitted separately from the request.

In some implementations, the secret information may include a password, a passcode, a personal identification number (PIN), and/or another portion of information known to the user and concealed from other persons. Accordingly, the BMI may encrypt the secret information before transmitting the secret information to the front-end device (e.g., directly or via the base station, as described above). For example, the BMI may apply a public key (e.g., provided by the front-end device) of a public-private (or other asymmetric) key pair to encrypt the secret information. In another example, the BMI may apply a key (e.g., provided by the front-end device) of a symmetric key pair to encrypt the secret information.

As shown by reference number 115, the front-end device may encrypt the secret information associated with the user. For example, the front-end device may apply a public key (e.g., provided by the authentication system) of a public-private (or other asymmetric) key pair to encrypt the secret information. In another example, the front-end device may apply a key (e.g., provided by the authentication system) of a symmetric key pair to encrypt the secret information.

In some implementations, the front-end device may decrypt the encrypted secret information received from the BMI (e.g., as described above) and re-encrypt the decrypted secret information using a different key (e.g., provided by the authentication system). Alternatively, the BMI may use a key provided by the authentication system such that the front-end device may forward the encrypted secret information without any intervening decryption.

Accordingly, as shown by reference number 120, the front-end device may transmit, and the authentication system may receive, the encrypted secret information. For example, the front-end device may transmit a request that includes a message and/or another similar data structure that initiates an authorization procedure with the authentication system. Accordingly, the encrypted secret information may be included with the request. For example, the front-end device may extract the secret information from the data structure that is the request from the BMI and encode the secret information into the data structure that is the request to the authentication system. In another example, the front-end device may encode the request from the BMI into the data structure that is the request to the authentication system.

Figure 1B:
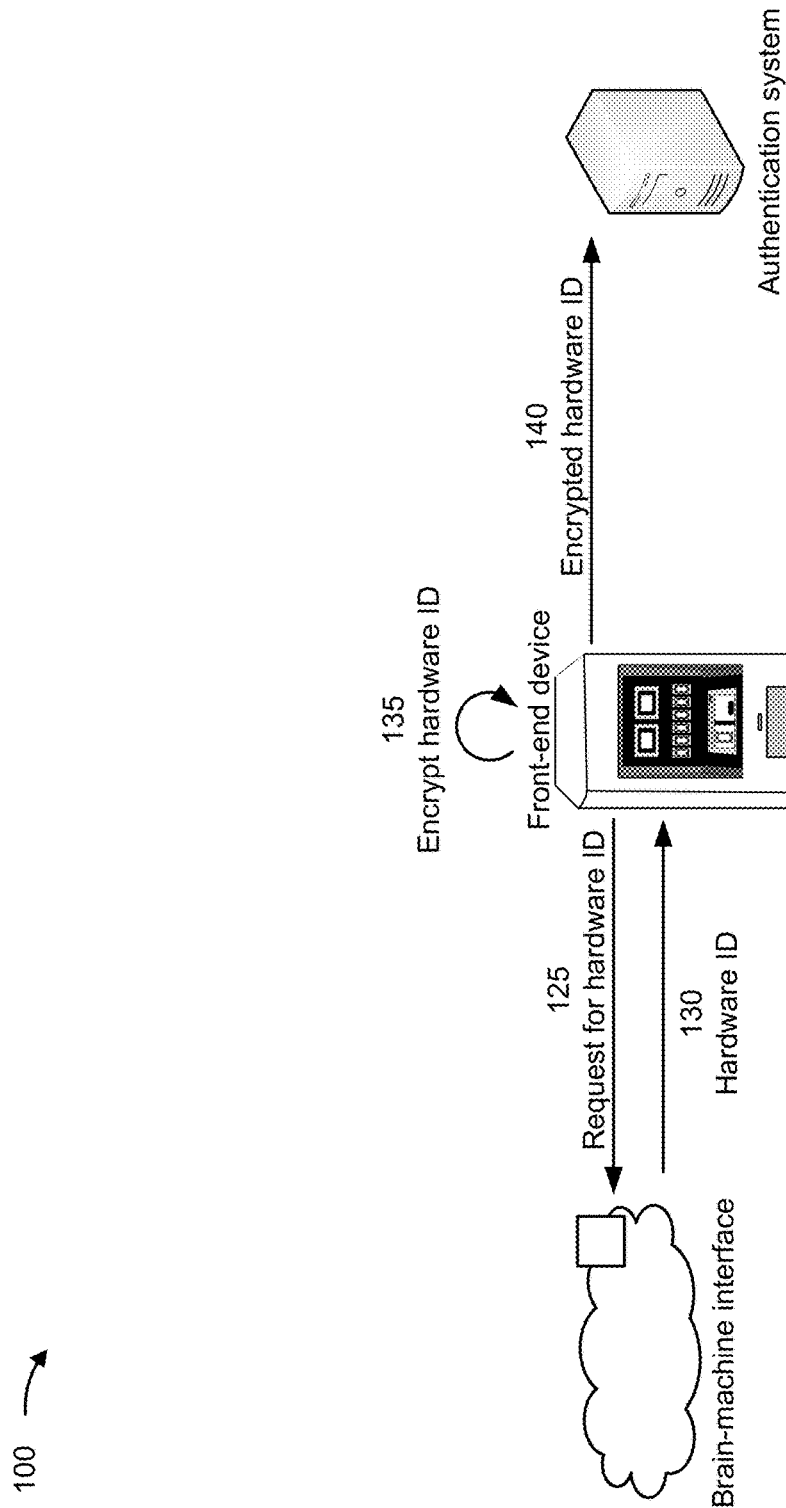

In order to securely authenticate the user without increasing latency, the front-end device may transmit, and the BMI may receive, a request for an identifier associated with a hardware component (e.g., one or more hardware components) of the BMI, as shown in FIG. 1B and by reference number 125. The request may include a message and/or another similar data structure that forms part of the authorization procedure with the BMI. In some implementations, the request may include an alphanumeric identifier associated with the front-end device and/or another piece of information that the BMI uses to verify that the request is from the front-end device. For example, the request may include a machine name, a medium access control (MAC) address, an Internet protocol (IP) address, and/or another identifier associated with the front-end device that the BMI can map to the initial request transmitted by the BMI (e.g., as described in connection with reference number 105).

The identifier associated with the hardware component may include a model number, a serial number, and/or another identifier associated with a chip (e.g., one or more application-specific integrated circuits (ASICs) or other chips), a microprocessor, a memory, an antenna, an amplifier (and/or another beamforming component), a modulator (and/or another analog-to-digital (ADC) component), a wired port (e.g., a universal serial bus (USB) port), and/or another hardware component of the BMI. Accordingly, as shown by reference number 130, the BMI may transmit, and the front-end device may receive, an indication of the identifier associated with the hardware component.

In some implementations, the BMI may encrypt the indication of the identifier before transmitting the indication of the identifier to the front-end device (e.g., directly or via the base station, as described above). For example, the BMI may apply a public key (e.g., provided by the front-end device) of a public-private (or other asymmetric) key pair to encrypt the indication of the identifier. In another example, the BMI may apply a key (e.g., provided by the front-end device) of a symmetric key pair to encrypt the indication of the identifier.

As shown by reference number 135, the front-end device may encrypt the indication of the identifier associated with the hardware component. For example, the front-end device may apply a public key (e.g., provided by the authentication system) of a public-private (or other asymmetric) key pair to encrypt the indication of the identifier. In another example, the front-end device may apply a key (e.g., provided by the authentication system) of a symmetric key pair to encrypt the indication of the identifier.

In some implementations, the front-end device may decrypt the encrypted indication of the identifier received from the BMI (e.g., as described above) and re-encrypt the decrypted indication of the identifier using a different key (e.g., provided by the authentication system). Alternatively, the BMI may use a key provided by the authentication system such that the front-end device may forward the encrypted indication of the identifier without any intervening decryption.

Accordingly, as shown by reference number 140, the front-end device may transmit, and the authentication system may receive, the encrypted indication of the identifier. For example, the front-end device may transmit a message and/or another similar data structure that forms part of the authorization procedure with the authentication system. For example, the front-end device may extract the indication of the identifier from the data structure that is received from the BMI and encode the indication of the identifier into the data structure that is the message to the authentication system. In another example, the front-end device may encode the message received from the BMI into the data structure that is the message to the authentication system.

Figure 1C:
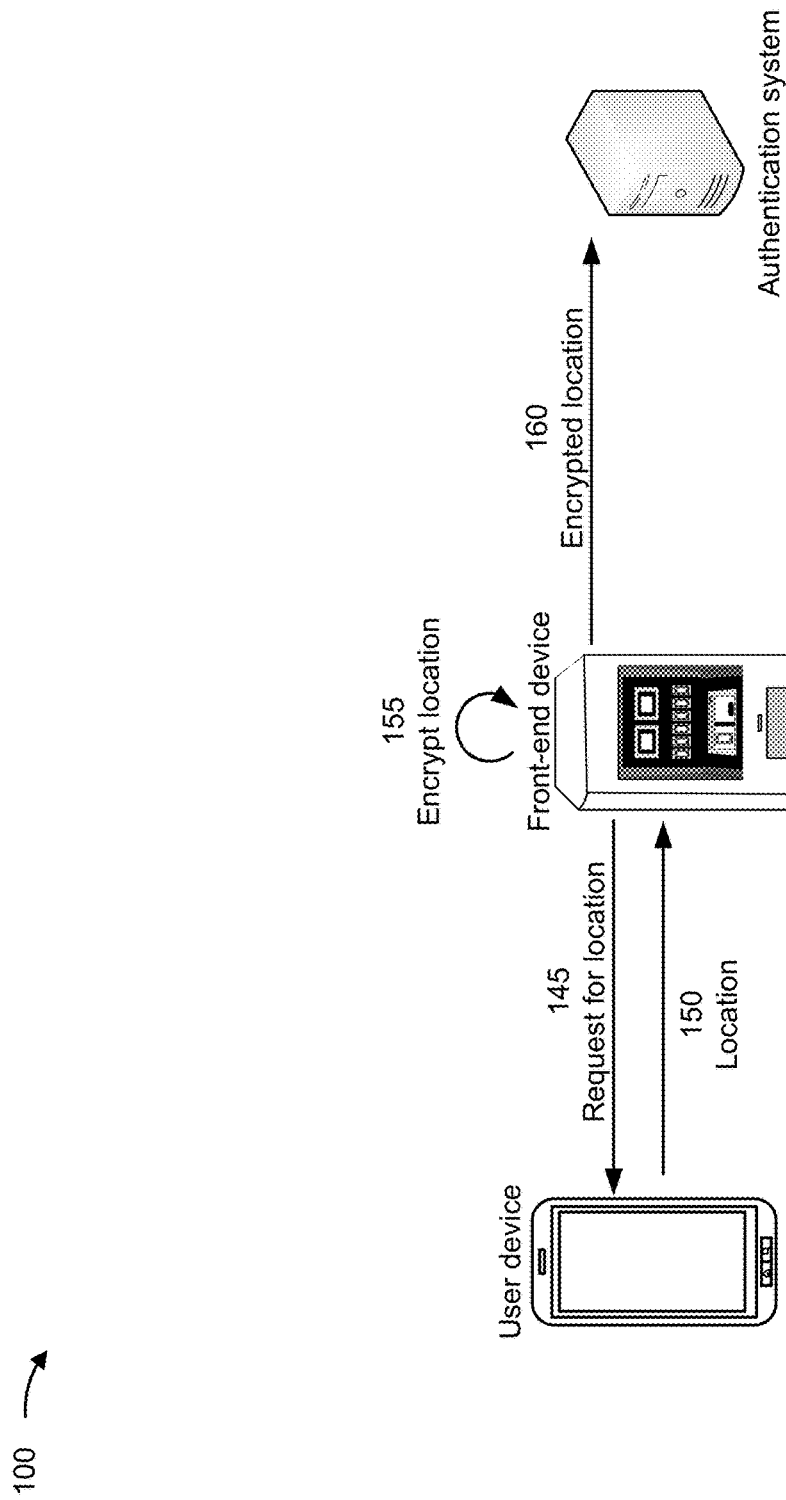

Additionally, or alternatively, and as shown in FIG. 1C and by reference number 145, the front-end device may transmit, and the user device may receive, a request for a location (e.g., geographical coordinates, an estimated address, and/or another absolute location or a location relative to a cellular tower, WiFi router, and/or other network component and/or another relative location). In some implementations, the front-end device may use credentials associated with the user device, as described in connection with FIG. 3, to request the location.

The request may include a message and/or another similar data structure that forms part of the authorization procedure with the BMI. In some implementations, the request may include an alphanumeric identifier associated with the front-end device and/or another piece of information that the user device uses to verify that the request is from the front-end device. For example, the request may include a machine name, a MAC address, an IP address, and/or another identifier associated with the front-end device that the user device can verify against a whitelist. In another example, the request may include a key, a certificate, and/or another credential that was previously provided to the user device (e.g., by the front-end device and/or the authentication system) so that the user device can verify the request.

Accordingly, as shown by reference number 150, the user device may transmit, and the front-end device may receive, an indication of the location of the user device. In some implementations, the user device may encrypt the indication of the location before transmitting the indication of the location to the front-end device (e.g., directly or via the base station, as described above). For example, the user device may apply a public key (e.g., provided by the front-end device) of a public-private (or other asymmetric) key pair to encrypt the indication of the location. In another example, the user device may apply a key (e.g., provided by the front-end device) of a symmetric key pair to encrypt the indication of the location.

As shown by reference number 155, the front-end device may encrypt the indication of the location of the user device. For example, the front-end device may apply a public key (e.g., provided by the authentication system) of a public-private (or other asymmetric) key pair to encrypt the indication of the location. In another example, the front-end device may apply a key (e.g., provided by the authentication system) of a symmetric key pair to encrypt the indication of the location.

In some implementations, the front-end device may decrypt the encrypted indication of the location received from the user device (e.g., as described above) and re-encrypt the decrypted indication of the location using a different key (e.g., provided by the authentication system). Alternatively, the user device may use a key provided by the authentication system such that the front-end device may forward the encrypted indication of the location without any intervening decryption.

Accordingly, as shown by reference number 160, the front-end device may transmit, and the authentication system may receive, the encrypted indication of the location. For example, the front-end device may transmit a message and/or another similar data structure that forms part of the authorization procedure with the authentication system. For example, the front-end device may extract the indication of the location from the data structure that is received from the user device and encode the indication of the location into the data structure that is the message to the authentication system. In another example, the front-end device may encode the message received from the user device into the data structure that is the message to the authentication system.

Figure 1D:
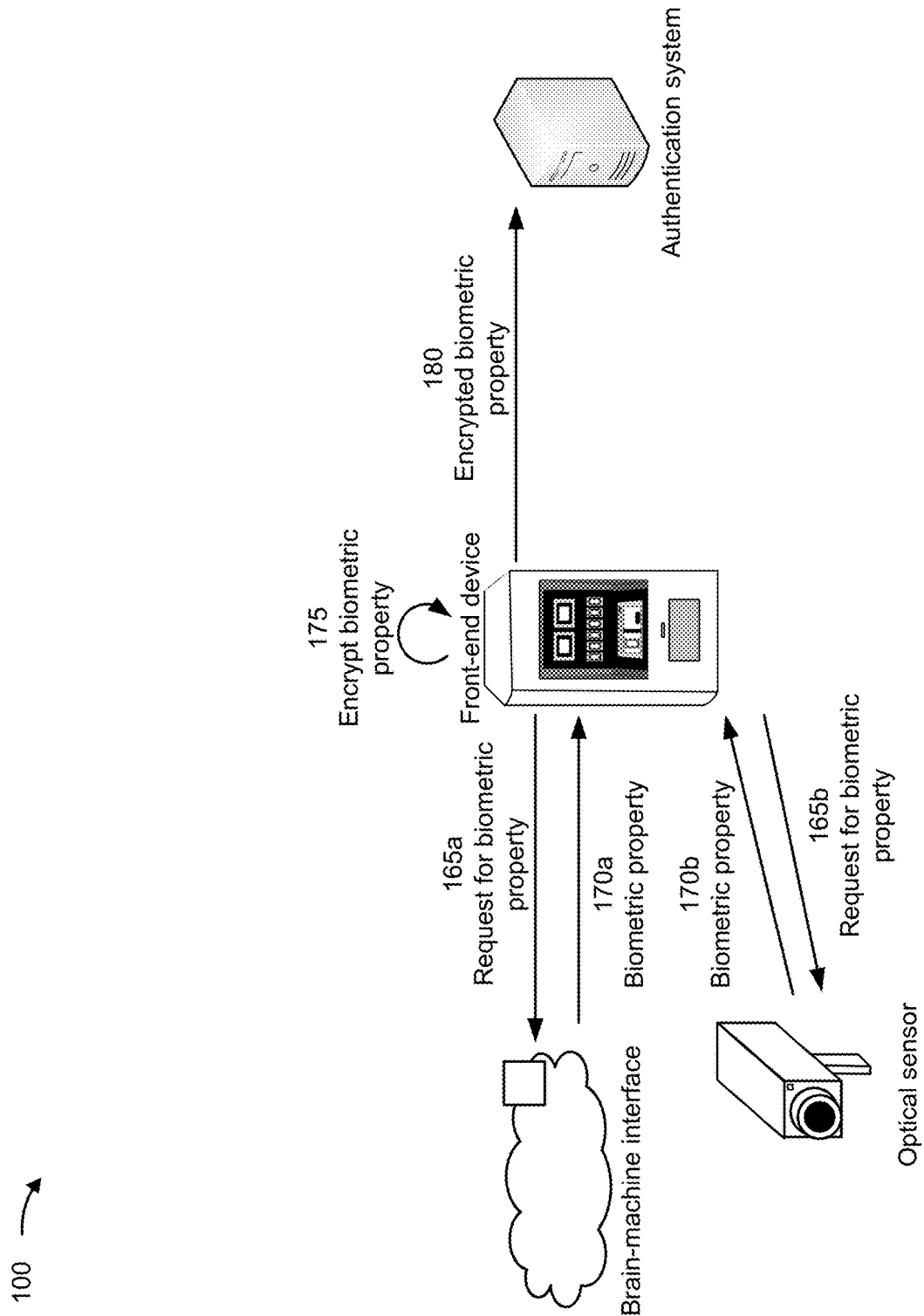

Additionally, or alternatively, and as shown in FIG. 1D and by reference number 165*a*, the front-end device may transmit, and the BMI may receive, a request for a biometric property associated with the user. For example, the biometric property may be brainwaves (e.g., one or more brainwaves) associated with the user.

The request may include a message and/or another similar data structure that forms part of the authorization procedure with the BMI. In some implementations, the request may include an alphanumeric identifier associated with the front-end device and/or another piece of information that the BMI uses to verify that the request is from the front-end device. For example, the request may include a machine name, a MAC address, an IP address, and/or another identifier associated with the front-end device that the BMI can map to the initial request transmitted by the BMI (e.g., as described in connection with reference number 105).

Accordingly, as shown by reference number 170*a*, the BMI may transmit, and the front-end device may receive, an indication of the biometric property associated with the user. In some implementations, the BMI may encrypt the indication of the biometric property before transmitting the indication of the biometric property to the front-end device (e.g., directly or via the base station, as described above). For example, the BMI may apply a public key (e.g., provided by the front-end device) of a public-private (or other asymmetric) key pair to encrypt the indication of the biometric property. In another example, the BMI may apply a key (e.g., provided by the front-end device) of a symmetric key pair to encrypt the indication of the biometric property.

Additionally, or alternatively, the biometric property may be a fingerprint, an optical scan, a facial scan, and/or another visual indicator associated with the user. Accordingly, as shown by reference number 165*b*, the front-end device may transmit, and an optical sensor may receive, a command to capture the biometric property associated with the user. The command may be generated by a driver, executed by the front-end device, for the optical sensor that is at least partially integrated (e.g., physically, logically, and/or virtually) with the front-end device or is communicatively coupled with the front-end device.

Accordingly, as shown by reference number 170*b*, the optical sensor may transmit, and the front-end device may receive, an indication of the biometric property associated with the user. In some implementations, the optical sensor may encrypt the indication of the biometric property before transmitting the indication of the biometric property to the front-end device (e.g., directly or via the base station, as described above). For example, the optical sensor may apply a public key (e.g., provided by the front-end device) of a public-private (or other asymmetric) key pair to encrypt the indication of the biometric property. In another example, the optical sensor may apply a key (e.g., provided by the front-end device) of a symmetric key pair to encrypt the indication of the biometric property.

As shown by reference number 175, the front-end device may encrypt the indication of the biometric property associated with the user. For example, the front-end device may apply a public key (e.g., provided by the authentication system) of a public-private (or other asymmetric) key pair to encrypt the indication of the biometric property. In another example, the front-end device may apply a key (e.g., provided by the authentication system) of a symmetric key pair to encrypt the indication of the biometric property.

In some implementations, the front-end device may decrypt the encrypted indication of the biometric property received from the optical sensor (e.g., as described above) and re-encrypt the decrypted indication of the biometric property using a different key (e.g., provided by the authentication system). Alternatively, the optical sensor may use a key provided by the authentication system such that the front-end device may forward the encrypted indication of the biometric property without any intervening decryption.

Accordingly, as shown by reference number 180, the front-end device may transmit, and the authentication system may receive, the encrypted indication of the biometric property. For example, the front-end device may transmit a message and/or another similar data structure that forms part of the authorization procedure with the authentication system. For example, the front-end device may extract the indication of the biometric property from the data structure that is received from the optical sensor and encode the indication of the biometric property into the data structure that is the message to the authentication system. In another example, the front-end device may encode the message received from the optical sensor into the data structure that is the message to the authentication system.

Figure 1E:
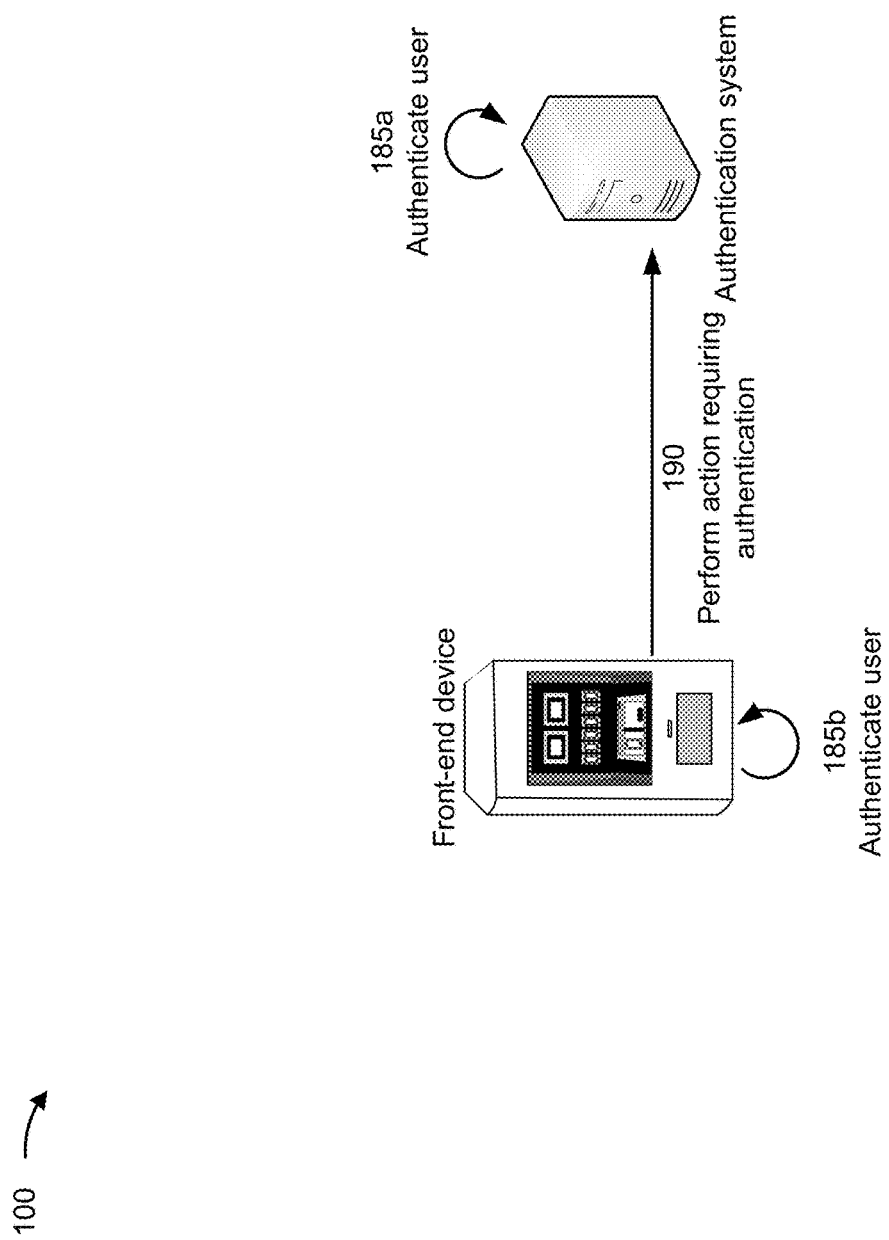

Accordingly, as shown in FIG. 1E and by reference number 185a, the authentication system may authenticate the user based on the secret information associated with the user, the location of the user device, the identifier associated with the hardware component, and/or the indication of the biometric property associated with the user. For example, the authentication system may authenticate the user based on the secret information matching stored information previously provided to the authentication system by the user.

Additionally, the authentication system may authenticate the user based on the location of the user device satisfying a location threshold. For example, the location threshold may be relative to a location of the front-end device. In some implementations, the location threshold may be preconfigured (e.g., to a default value or to a value set, or selected from a plurality of possible values, by the user). Alternatively, the authentication system may dynamically modify the location threshold. For example, the authentication system may increase the location threshold based on the identifier, associated with the hardware component, matching a stored identifier (e.g., as described below) and/or the indication of the biometric property, associated with the user, matching a stored biometric property (e.g., as described below).

Additionally, or alternatively, the authentication system may authenticate the user based on the identifier associated with the hardware component matching a stored identifier previously provided to the authentication system by the user. For example, the BMI may have provided the stored identifier during a registration procedure associated with the BMI.

Additionally, or alternatively, the authentication system may authenticate the user based on the biometric property associated with the user matching a stored biometric property previously provided to the authentication system by the user. For example, the authentication system may calculate a similarity score between features of a received fingerprint and features of a stored fingerprint, features of a received optical scan and features of a stored optical scan, and/or features of a received facial scan and features of a stored facial scan. Accordingly, the authentication system may authenticate the user based on the similarity score satisfying a similarity threshold.

In implementations where the biometric property includes brainwaves associated with the user, the authentication system may extract vectors (e.g., one or more vectors) associated with the brainwaves. For example, the vectors may be feature vectors extracted using a fast Fourier transform (FFT), a bandpass filter, a smoothing algorithm, and/or another algorithm that extracts features from time-based measurements. Accordingly, the authentication system may generate a similarity score based on the extracted vectors and stored vectors (e.g., one or more stored vectors) associated with the user and may authenticate the user further based on the similarity score (e.g., based on the similarity score satisfying a similarity threshold).

In some implementations, the stored vectors may be based on brainwaves previously provided to the authentication system by the user. For example, the BMI may have provided brainwaves associated with a baseline state of the user during a registration procedure associated with the BMI, such that the authentication system may extract the stored vectors from the brainwaves associated with the baseline state of the user.

Based on authenticating the user, the authentication system may perform an action. For example, the authentication system may transmit private information (e.g., account balances) based on authenticating the user. Additionally, or alternatively, the authentication system may modify an account associated with the user (e.g., by performing a transaction using the account) based on authenticating the user.

Although described in connection with the authentication system performing the authentication, alternative implementations may include authentication performed at the front-end device. Accordingly, as shown by reference number 185b, the front-end device may authenticate the user based on the secret information associated with the user, the location of the user device, the identifier associated with the hardware component, and/or the indication of the biometric property associated with the user. The front-end device may authenticate the user similarly as the authentication system described above. Accordingly, as shown by reference number 190, the front-end device may contact the authentication system to perform an action based on authenticating the user. For example, the front-end device may request private information (e.g., account balances) based on authenticating the user. Additionally, or alternatively, the front-end device may request to modify an account associated with the user (e.g., by performing a transaction using the account) based on authenticating the user.

Although described in connection with a front-end device, alternative implementations may include authentication performed by a remote server that hosts a website. Accordingly, the user may use the BMI to navigate to a portion of the website requiring authentication. Additionally, or alternatively, the user may use the BMI to interact with the website to view private information and/or to modify an account associated with the user.

By using techniques as described in connection with FIGS. 1A-1E, the front-end device may authenticate the user using the BMI without using additional memory on the BMI and without increasing latency by asking the user to enter a two-factor code. As a result, processing resources, power, and memory are conserved at the BMI, and the front-end device experiences reduced latency without compromising security.

As indicated above, FIGS. 1A-1E are provided as an example. Other examples may differ from what is described with regard to FIGS. 1A-1E.

Figure 2:
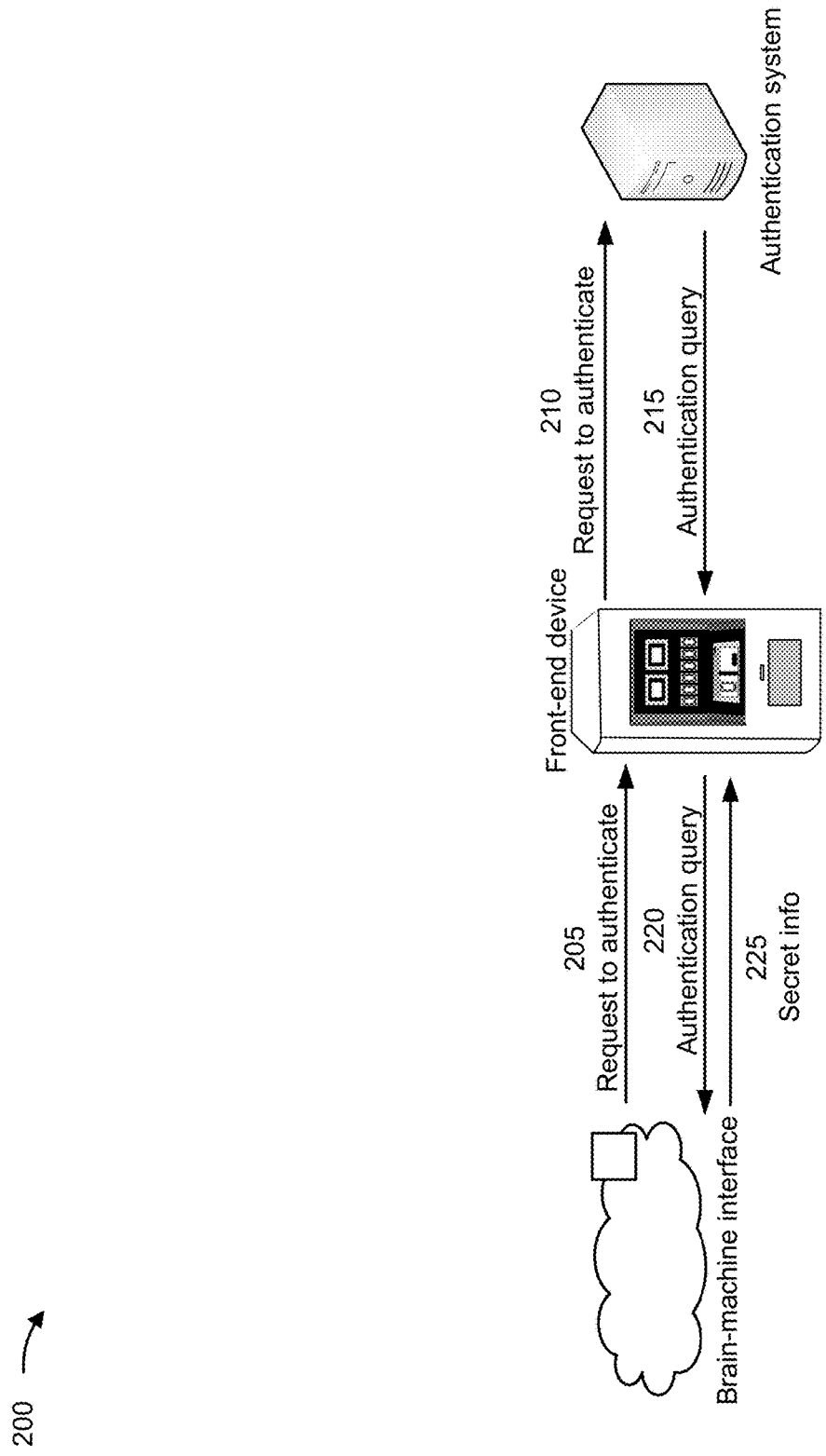
FIG. 2 is a diagram of an example implementation relating to authentication remotely from front-end devices using brain-machine interfaces.

FIG. 2 is a diagram of an example 200 associated with authentication remotely from front-end devices using BMIs. As shown in FIG. 2, example 200 includes a BMI, a front-end device, and an authentication system. These devices are described in more detail in connection with FIGS. 4 and 5.

Similar to example 100, the BMI may transmit, and the front-end device may receive, a request to authenticate a user, as shown by reference number 205. The BMI may transmit the request as described in connection with reference number 105 of FIG. 1A.

Accordingly, as shown by reference number 210, the front-end may transmit, and the authentication system may receive, a request associated with authenticating the user. For example, the front-end device may transmit a request that includes a message and/or another similar data structure that initiates an authorization procedure with the authentication system. Accordingly, an identifier (e.g., a username, a machine name, a MAC address, and/or another identifier) associated with the BMI may be included with the request. For example, the front-end device may extract the identifier from the data structure that is the request from the BMI and encode the identifier into the data structure that is the request to the authentication system. In another example, the front-end device may encode the request from the BMI into the data structure that is the request to the authentication system.

In response, and as shown by reference number 215, the authentication system may transmit, and the front-end device may receive, an authentication query. For example, the authentication system may determine, from a database and/or another similar data structure, a query (e.g., a single query or a randomly selected query from a plurality of queries) associated with the BMI. In some implementations, the user may have selected the query (or the plurality of queries) and provided a corresponding response (or plurality of responses) during a registration procedure with the authentication system.

Accordingly, as shown by reference number 220, the front-end device may transmit, and the BMI may receive, the authentication query. In response, and as shown by reference number 225, the BMI may transmit, and the front-end device may receive, secret information associated with the user. Accordingly, the secret information may include a response to the authentication query. Therefore, by using techniques as described in connection with FIG. 2, the user may answer the authentication query in lieu of providing a password or another similar type of secret information.

As indicated above, FIG. 2 is provided as an example. Other examples may differ from what is described with regard to FIG. 2.

Figure 3:
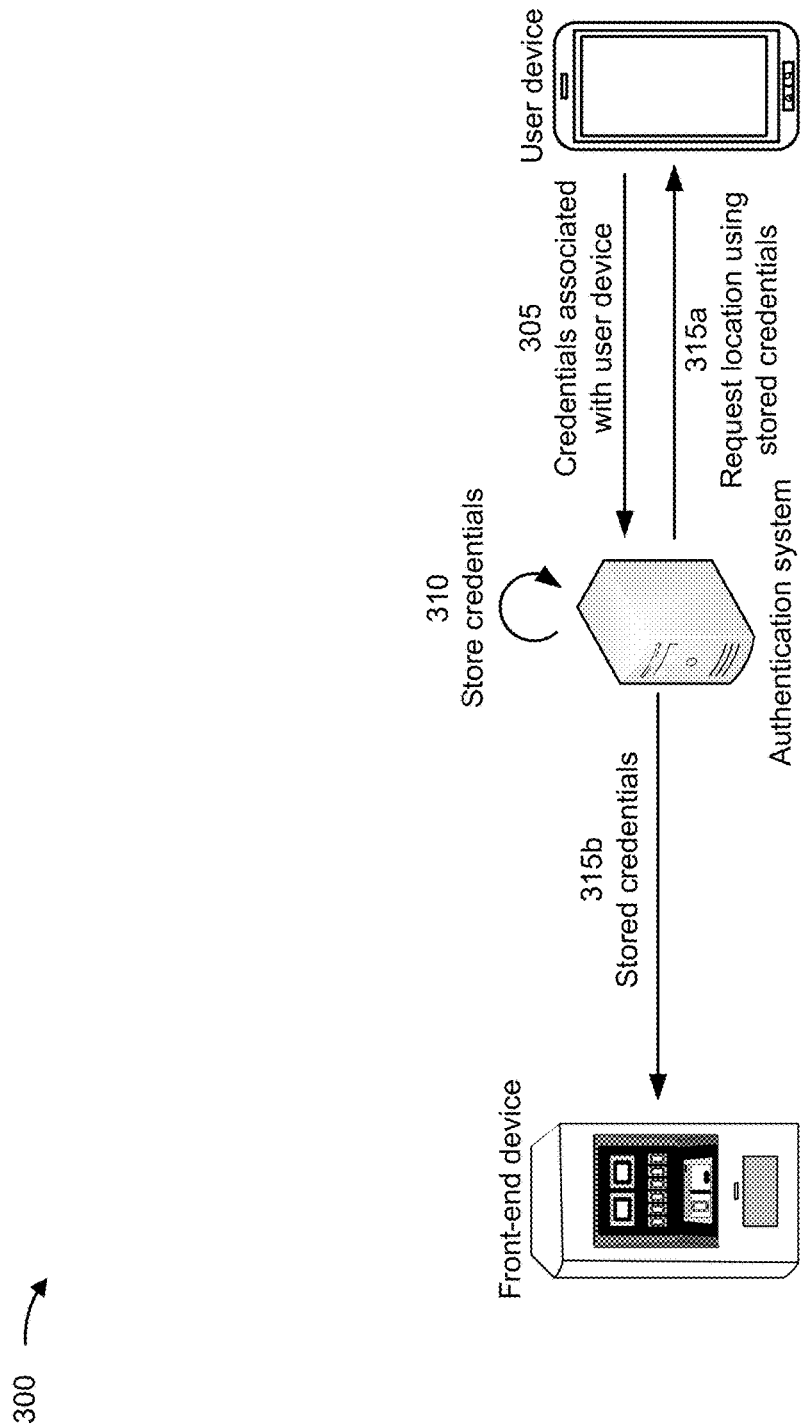
FIG. 3 is a diagram of an example implementation relating to authentication using user devices and brain-machine interfaces.

FIG. 3 is a diagram of an example 300 associated with authentication using user devices and BMIs. As shown in FIG. 3, example 300 includes a front-end device, a user device, and an authentication system. These devices are described in more detail in connection with FIGS. 4 and 5.

As shown by reference number 305, the user device may transmit, and the authentication system may receive, credentials associated with the user device. For example, the user device may provide an IP address, a port, a MAC address, a key, a certificate, and/or another identifier associated with the user device that the authentication system may use to push requests to the user device. For example, the user device may execute a mobile application configured to generate responses to the requests.

Accordingly, as shown by reference number 310, the authentication system may store the credentials. For example, the authentication system may encrypt the credentials and store the encrypted credentials. Therefore, as shown by reference number 315a, the authentication system may use the stored credentials to request a location of the user device (e.g., during an authentication procedure, such as described in connection with FIGS. 1A-1E). For example, the authentication system may include the credentials in a message and/or other data structure that is the request.

Alternatively, the front-end device may request the location of the user device (e.g., during an authentication procedure, such as described in connection with FIGS. 1A-1E). Accordingly, as shown by reference number 315b, the authentication system may transmit, and the front-end device may receive, the stored credentials to use to request the location of the user device. For example, the front-end device may include the credentials in a message and/or other data structure that is the request. Therefore, by using techniques as described in connection with FIG. 3, the user may be authenticated using a location of the user device.

As indicated above, FIG. 3 is provided as an example. Other examples may differ from what is described with regard to FIG. 3.

Figure 4:
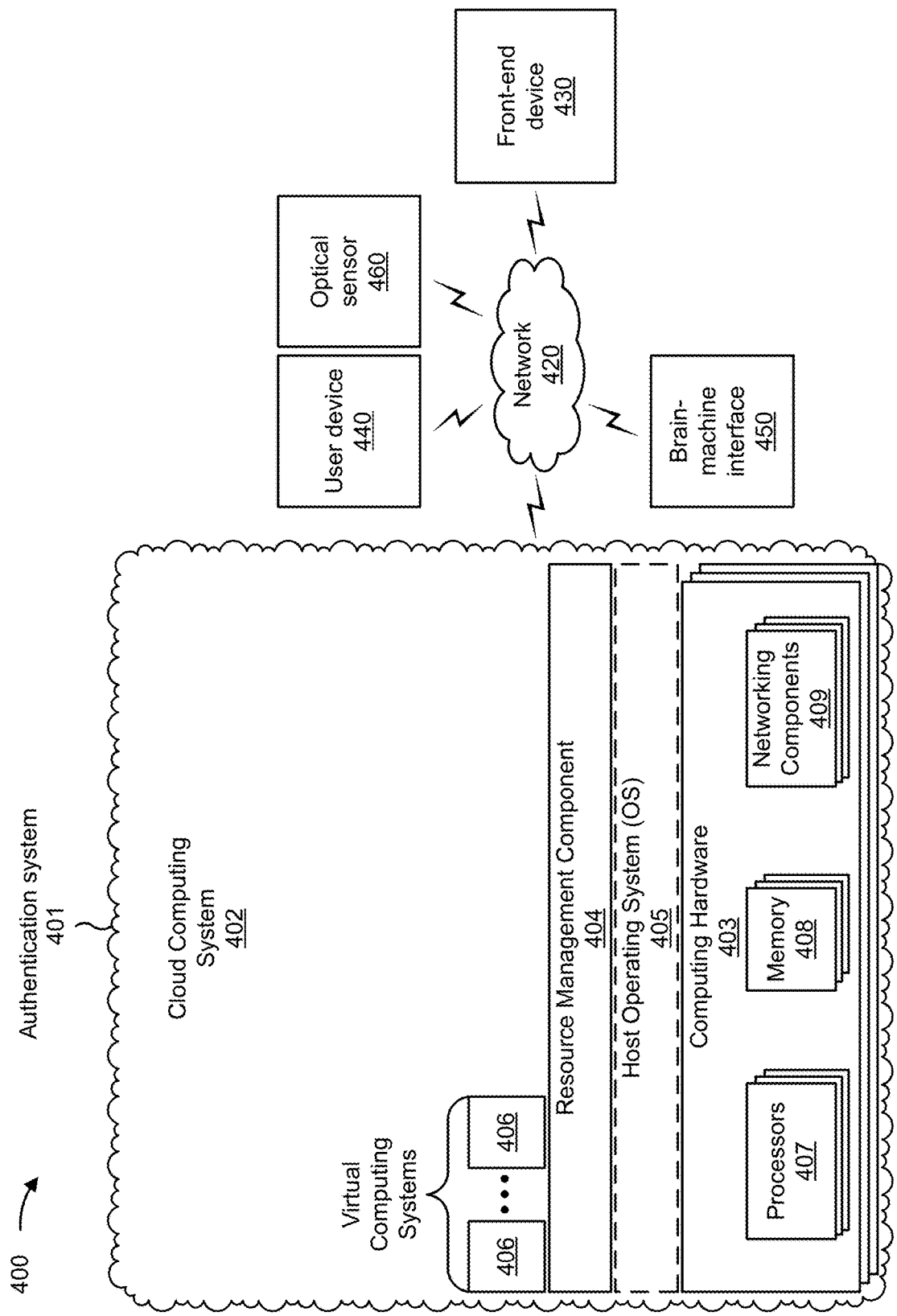
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an authentication system 401, which may include one or more elements of and/or may execute within a cloud computing system 402. The cloud computing system 402 may include one or more elements 403-409, as described in more detail below. As further shown in FIG. 4, environment 400 may include a network 420, a front-end device 430, a user device 440, a BMI 450, and/or an optical sensor 460. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. The virtual computing system 406 may include a virtual machine, a container, or a hybrid environment that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the authentication system 401 may include one or more elements 403-409 of the cloud computing system 402, may execute within the cloud computing system 402, and/or may be hosted within the cloud computing system 402, in some implementations, the authentication system 401 may not be cloud-based (e.g., may be implemented outside of a cloud computing system) or may be partially cloud-based. For example, the authentication system 401 may include one or more devices that are not part of the cloud computing system 402, such as device 500 of FIG. 5, which may include a standalone server or another type of computing device. The authentication system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The front-end device 430 includes one or more devices capable of facilitating an electronic transaction. For example, the front-end device 430 may include a PoS terminal, a payment terminal (e.g., a credit card terminal, a contactless payment terminal, a mobile credit card reader, or a chip reader), and/or an ATM. In some implementations, the front-end device 430 includes an access control terminal (e.g., used to control physical access to a secure area), such as an access control panel used to control an access-controlled entry (e.g., a turnstile, a door, a gate, or another physical barrier). The front-end device 430 may include an output device to transmit information to a user. Example output components of the front-end device 430 include a display and/or a speaker. The front-end device 430 may further include an input device to facilitate obtaining data (e.g., secret information) and/or to facilitate interaction with and/or authorization from the user. Example input components of the front-end device 430 include a microphone, a keyboard, a touchscreen, a magnetic stripe reader, a chip reader, and/or an RF signal reader (e.g., a near-field communication (NFC) reader).

The user device 440 includes one or more devices capable of wireless and/or wired communication. Accordingly, the user device 440 may include a communication device and/or a computing device. For example, the user device 440 may include a wireless communication device, a mobile phone, a user equipment (UE), a tablet computer, a wearable communication device (e.g., a smart wristwatch, a pair of smart eyeglasses, a head mounted display, or a virtual reality headset), or a similar type of device. Additionally, or alternatively, the user device 440 may be capable of communicating with the authentication system 401 via the network 420, as described elsewhere herein.

The BMI 450 includes one or more devices capable of detecting, demodulating, and/or decoding electromagnetic waves generated by a human brain. The BMI 450 may include a port, such as a USB port, for wired communications. Additionally, or alternatively, the BMI 450 may include a transceiver for wireless communications.

The optical sensor 460 includes one or more devices capable of generating digital signals based on light. For example, the optical sensor 460 may include a camera or a scanner. In some implementations, the optical sensor 460 may be at least partially integrated with the front-end device 430 and/or the user device 440. Alternatively, the optical sensor 460 may be a standalone device (e.g., similar to device 500 of FIG. 5) that communicates (e.g., wired and/or wirelessly) with the front-end device 430 and/or the user device 440.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
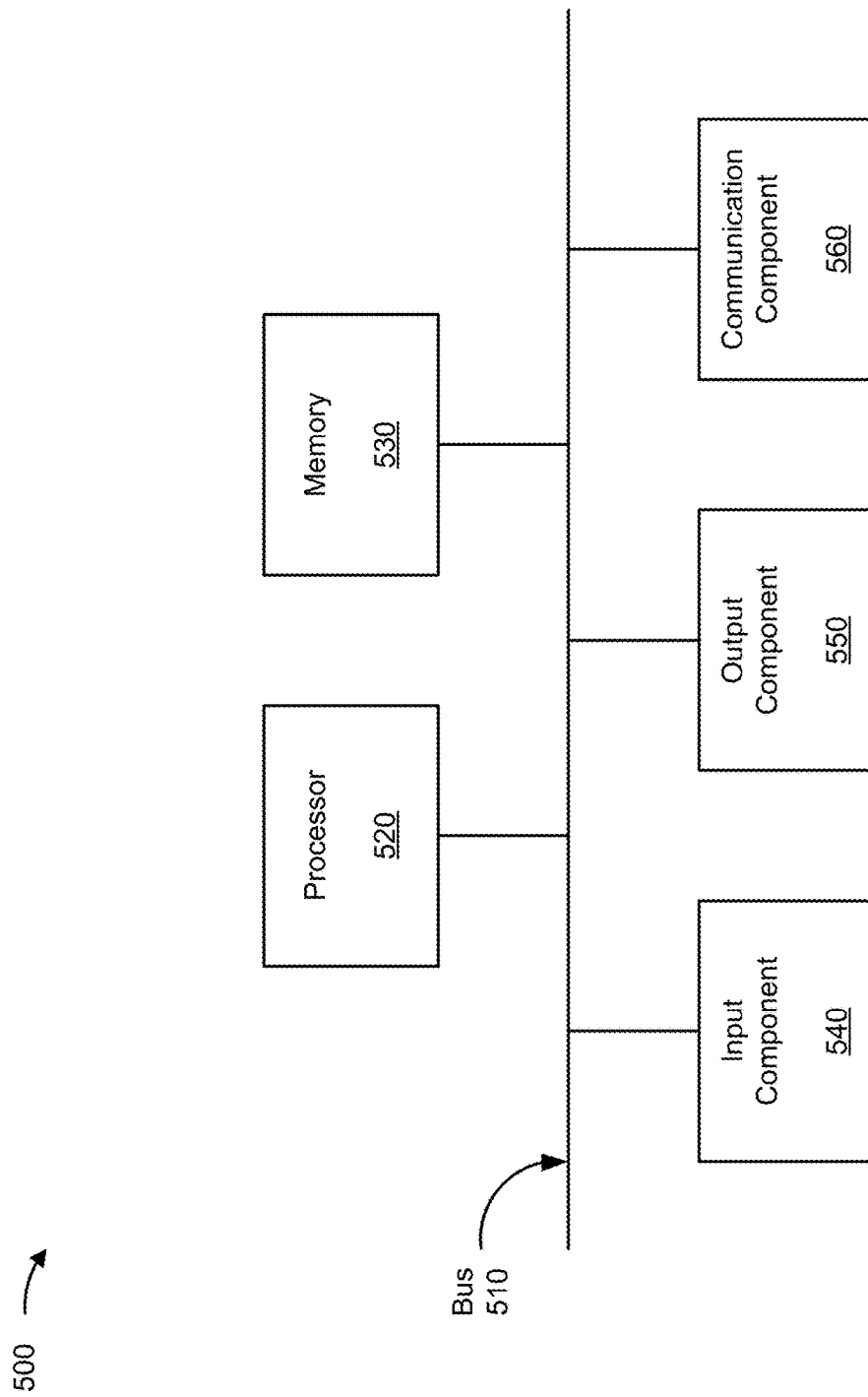
FIG. 5 is a diagram of example components of one or more devices of FIG. 4.

FIG. 5 is a diagram of example components of a device 500, which may correspond to a front-end device, an authentication system, a BMI, and/or a user device. In some implementations, a front-end device, an authentication system, a BMI, and/or a user device may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
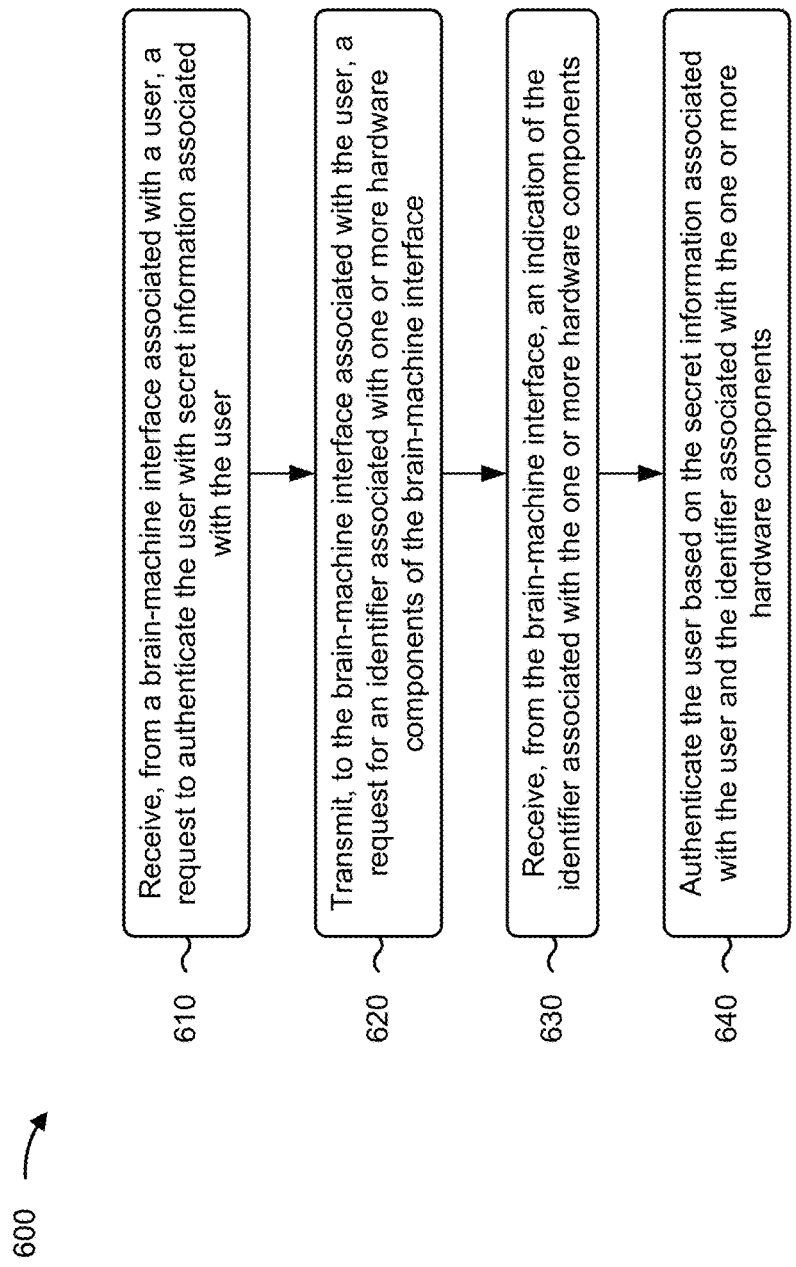
FIG. 6 is a flowchart of an example process relating to authentication using brain-machine interfaces.

FIG. 6 is a flowchart of an example process 600 associated with authentication using brain-machine interfaces. In some implementations, one or more process blocks of FIG. 6 may be performed by a system (e.g., authentication system 401). In some implementations, one or more process blocks of FIG. 6 may be performed by another device or a group of devices separate from or including the device, such as front-end device 430, user device 440, BMI 450, and/or optical sensor 460. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a BMI associated with a user, a request to authenticate the user with secret information associated with the user (block 610). As further shown in FIG. 6, process 600 may include transmitting, to the BMI associated with the user, a request for an identifier associated with one or more hardware components of the BMI (block 620). As further shown in FIG. 6, process 600 may include receiving, from the BMI, an indication of the identifier associated with the one or more hardware components (block 630). Accordingly, as further shown in FIG. 6, process 600 may include authenticating the user based on the secret information associated with the user and the identifier associated with the one or more hardware components (block 640). In some implementations, the authentication may be further based on a location of an external device associated with the user and/or a biometric property associated with the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E, 2, and/or 3.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device, comprising:
   one or more memories; and
   one or more processors, coupled to the one or more memories, configured to:
      receive, from a second device configured to detect electromagnetic waves generated by a human brain of a user:
         a message that initiates an authentication procedure associated with the first device, and
         secret information, associated with the user, different from the message;
      transmit, to the second device and according to the authentication procedure, a request for an identifier of one or more hardware components of the second device;
      receive, from the second device, an indication of the identifier of the one or more hardware components;
      transmit, to a third device that is a user device of the user and according to the authentication procedure, a request for a location of the third device;
      receive, from the third device, an indication of the location of the third device;
      transmit, to a fourth device and according to the authentication procedure, the secret information associated with the user, the identifier of the one or more hardware components of the second device, and the location of the third device,
         wherein the first device, the second device, the third device, and the fourth device are different from each other; and
      receive, from the fourth device, an indication associated with an action,
         wherein the action is based on an authentication of the user that is based on the secret information associated with the user, the identifier of the one or more hardware components of the second device, and the location of the third device.

2. The first device of claim 1, wherein the secret information associated with the user comprises a password, a passcode, or a personal identification number (PIN).

3. The first device of claim 1, wherein the one or more processors, to receive the message and the secret information associated with the user, are configured to:
   receive, from the second device, the message;
   transmit, to the second device and based on receiving the message, an authentication query; and
   receive, from the second device, the secret information associated with the user in response to the authentication query.

4. The first device of claim 1, wherein the user device comprises a cellular phone associated with the user.

5. The first device of claim 1, wherein the one or more processors are further configured to:
   receive credentials associated with the third device,
      wherein the request for the location of the third device is transmitted using the credentials.

6. The first device of claim 1, wherein the identifier associated with the one or more hardware components comprises a model number, a serial number, or a combination thereof.

7. The first device of claim 1, wherein the fourth device is a remote server.

8. A method of authenticating a user associated with a brain-machine interface, comprising:
   receiving, by a first device and from a second device configured to detect electromagnetic waves generated by a human brain of a user:
      a message that initiates an authentication procedure with the first device, and
      secret information, associated with the user, different from the message;
   transmitting, to the second device and according to the authentication procedure, a request for an identifier of one or more hardware components of the second device;
   receiving, from the second device, an indication of the identifier of the one or more hardware components;
   transmitting, to a third device that is a user device of the user and according to the authentication procedure, a request for a location of the third device;
   receiving, from the third device, an indication of the location of the third device;
   transmitting, to a fourth device and according to the authentication procedure, the secret information associated with the user, the identifier associated with the one or more hardware components, and the location of the third device,
      wherein the first device, the second device, the third device, and the fourth device are different from each other; and
   receiving, from the fourth device, an indication associated with an action,
      wherein the action is based on an authentication of the user that is based on the secret information associated with the user, the identifier of the one or more hardware components of the second device, and the location of the third device.

9. The method of claim 8, wherein the second device is a front-end device that is attempting to authenticate the user.

10. The method of claim 8, further comprising:
    encrypting the secret information associated with the user, the identifier associated with the one or more hardware components, and the location of the third device for transmission to the fourth device.

11. The method of claim 8, wherein the indication associated with an action comprises an indication of at least one of private information associated with the user or account modification associated with the user, wherein the at least one of the private information or the account modification is based on the authentication of the user.

12. The method of claim 8, wherein the fourth device is a remote server.

13. The method of claim 8, further comprising:
encrypting the secret information associated with the user,
wherein the encrypted secret information is transmitted to the fourth device.

14. The method of claim 8, further comprising:
encrypting the indication of the identifier associated with the one or more hardware components,
wherein the encrypted indication is transmitted to the fourth device.

15. A non-transitory computer-readable medium storing a set of instructions, the set of instructions comprising:
one or more instructions that, when executed by one or more processors of a first device, cause the first device to:
receive, from a second device configured to detect electromagnetic waves generated by a human brain of a user:
a message that initiates an authentication procedure with the first device, and
secret information, associated with the user, different from the message;
receive, from the second device, an indication of a biometric property associated with the user;
transmit, to the second device and according to the authentication procedure, a request for an identifier of one or more hardware components of the second device;
receive, from the second device, an indication of the identifier of the one or more hardware components;
transmit, to a third device that is a user device of the user and according to the authentication procedure, a request for a location of the third device;
receive, from the third device, an indication of the location of the third device;
transmit, to a fourth device and according to the authentication procedure, the secret information associated with the user, the indication of the biometric property, the identifier associated with the one or more hardware components, and the location of the third device,
wherein the first device, the second device, the third device, and the fourth device are different from each other; and
receive, from the fourth device, an indication associated with an action,
wherein the action is based on an authentication of the user that is based on the secret information associated with the user, the identifier of the one or more hardware components of the second device, and the location of the third device.

16. The non-transitory computer-readable medium of claim 15, wherein the one or more instructions, when executed by the one or more processors, further cause the first device to:
transmit a command, to an optical sensor, to capture the biometric property associated with the user,
wherein the biometric property is received from the optical sensor.

17. The non-transitory computer-readable medium of claim 15, wherein the one or more instructions, when executed by the one or more processors, further cause the first device to:
transmit a command, to the second device, to capture one or more first brainwaves associated with the user,
wherein the biometric property comprises the one or more first brainwaves.

18. The non-transitory computer-readable medium of claim 17, wherein the authentication of the user is based on a similarity score based on one or more extracted vectors associated with the one or more first brainwaves and one or more stored vectors associated with the user.

19. The non-transitory computer-readable medium of claim 18, wherein the one or more instructions, when executed by the one or more processors, further cause the first device to:
receive, from the second device and based on transmitting the command, one or more second brainwaves associated with a baseline state of the user; and
extract the one or more stored vectors from the one or more second brainwaves associated with the baseline state of the user.

20. The non-transitory computer-readable medium of claim 15, wherein the one or more instructions, when executed by the one or more processors, further cause the first device to:
receive credentials associated with the second device,
wherein the request for the identifier is transmitted using the credentials.

* * * * *